United States Patent
Stidsen et al.

(10) Patent No.: US 11,785,285 B1
(45) Date of Patent: Oct. 10, 2023

(54) AUDIO VIDEO RECEIVER (AVR) ARCHITECTURE

(71) Applicant: Lenbrook Industries Limited, Pickering (CA)

(72) Inventors: Gregory R. Stidsen, Andover, MA (US); Jens Torben Sonderskov, Toronto (CA); Taresh Vadgama, Pickering (CA); Kevin Groeneveld, Bowmanville (CA)

( * ) Notice: Subject to any disclaimer, the term of this patent is extended or adjusted under 35 U.S.C. 154(b) by 0 days.

(21) Appl. No.: 17/749,476

(22) Filed: May 20, 2022

(51) Int. Cl.
  *H04N 21/4363* (2011.01)
  *H04N 21/426* (2011.01)

(52) U.S. Cl.
  CPC ... *H04N 21/4363* (2013.01); *H04N 21/42607* (2013.01)

(58) Field of Classification Search
  CPC .................. H04N 21/4363; H04N 21/42607
  See application file for complete search history.

(56) References Cited

U.S. PATENT DOCUMENTS

| | | | | |
|---|---|---|---|---|
| 5,487,092 | A * | 1/1996 | Finney | H04L 7/02 |
| | | | | 375/373 |
| 6,108,782 | A * | 8/2000 | Fletcher | H04L 41/142 |
| | | | | 713/153 |
| 6,907,041 | B1 * | 6/2005 | Turner | H04L 49/105 |
| | | | | 370/414 |
| 7,134,035 | B2 * | 11/2006 | Sharma | G06F 1/12 |
| | | | | 713/400 |
| 7,424,080 | B1 * | 9/2008 | Liu | H04N 21/4382 |
| | | | | 375/E7.278 |
| 8,352,629 | B2 * | 1/2013 | Steadman | H04H 60/04 |
| | | | | 725/32 |
| 8,516,373 | B2 | 8/2013 | Miyazaki et al. | |
| 8,923,141 | B2 * | 12/2014 | Bryant | H04J 3/0679 |
| | | | | 370/252 |
| 9,058,135 | B1 * | 6/2015 | Schumacher | G06F 1/10 |
| 2002/0059535 | A1 * | 5/2002 | Bekritsky | H04B 7/2628 |
| | | | | 713/400 |

(Continued)

OTHER PUBLICATIONS

International Search Report and Written Opinion for International Application No. PCT/US23/22711 dated Aug. 23, 2023.

*Primary Examiner* — Michael B. Pierorazio
(74) *Attorney, Agent, or Firm* — Erik A. Huestis; Sameer K. Pai; Foley Hoag LLP

(57) ABSTRACT

An AVR device in accordance with one or more embodiments connects audio and video source devices to audio and video rendering devices. A front panel user interface including a display is integrated in the housing of the AVR device. Input-output (IO) modules are coupled to a backplane board in the housing to be connected to the source devices and the rendering devices. The IO modules include at least one network interface. System-on-Modules (SoMs) are mounted on the backplane board. The SoMs are configured to decode and process audio and video data received from the audio and video source devices for rendering by the audio and video rendering devices and execute an operating system generating a GUI displayed on the display of the front panel user interface. A video subsystem module on the backplane board is configured to route the audio and video data between the plurality of SoMs and the IO modules.

16 Claims, 13 Drawing Sheets

(56) References Cited

U.S. PATENT DOCUMENTS

| | | | |
|---|---|---|---|
| 2003/0056225 A1* | 3/2003 | Bione | H04N 21/43615 725/98 |
| 2006/0195780 A1* | 8/2006 | Zuccolotto | G06F 40/18 715/273 |
| 2006/0203851 A1* | 9/2006 | Eidson | H04J 3/085 370/503 |
| 2007/0297799 A1* | 12/2007 | Tse-Au | H04Q 11/0005 398/58 |
| 2008/0069150 A1* | 3/2008 | Badt | H04J 3/0667 370/252 |
| 2009/0003613 A1 | 1/2009 | Christensen | |
| 2010/0085989 A1* | 4/2010 | Belhadj | H04J 3/0667 370/503 |
| 2010/0135314 A1* | 6/2010 | Fourcand | H04J 3/1611 370/419 |
| 2010/0272102 A1* | 10/2010 | Kobayashi | H04N 21/43632 370/389 |
| 2011/0164625 A1* | 7/2011 | Fourcand | H04J 3/0667 370/498 |
| 2011/0286442 A1* | 11/2011 | Maurice | H04W 56/0015 370/350 |
| 2011/0317991 A1* | 12/2011 | Tsai | G03B 9/70 396/180 |
| 2012/0250704 A1* | 10/2012 | Yamada | H04L 43/106 370/503 |
| 2012/0284434 A1* | 11/2012 | Warren | G06F 13/00 710/22 |
| 2012/0331026 A1* | 12/2012 | Menkhoff | H03H 17/0433 708/300 |
| 2013/0103861 A1* | 4/2013 | Ahn | H04W 52/0261 710/14 |
| 2013/0185374 A1* | 7/2013 | Fukasawa | H04L 67/00 709/208 |
| 2013/0215753 A1* | 8/2013 | Le Pallec | H04L 47/283 370/235 |
| 2014/0229650 A1 | 8/2014 | Fowler | |
| 2014/0373076 A1* | 12/2014 | Lerner | H04N 21/6175 725/71 |

\* cited by examiner

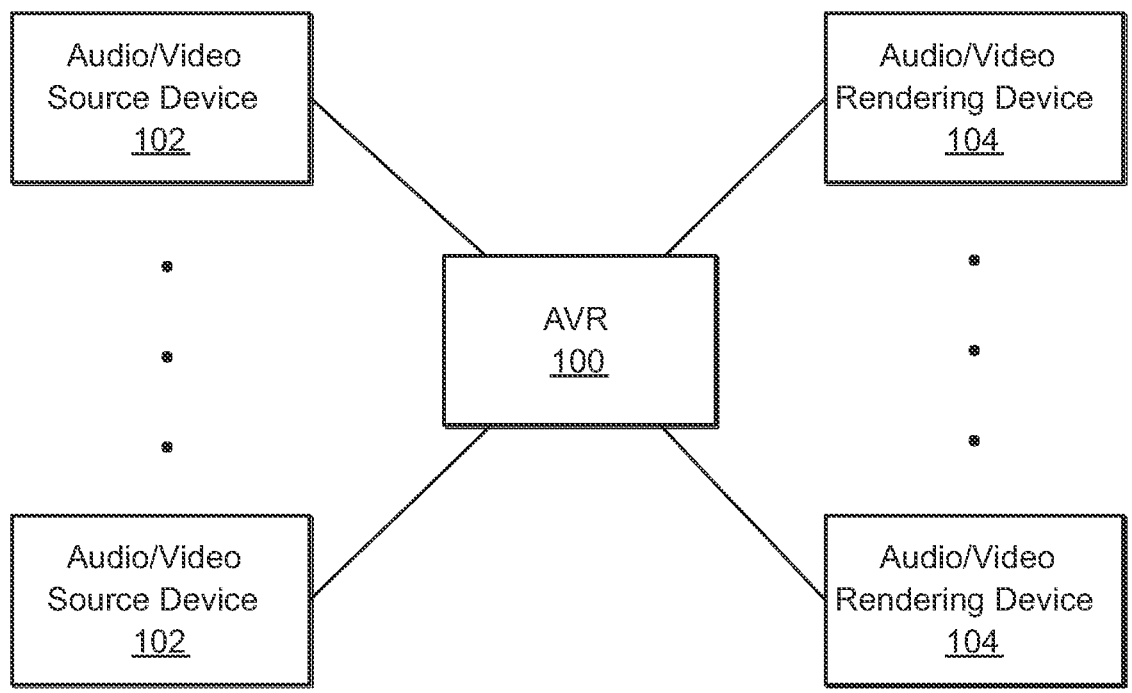

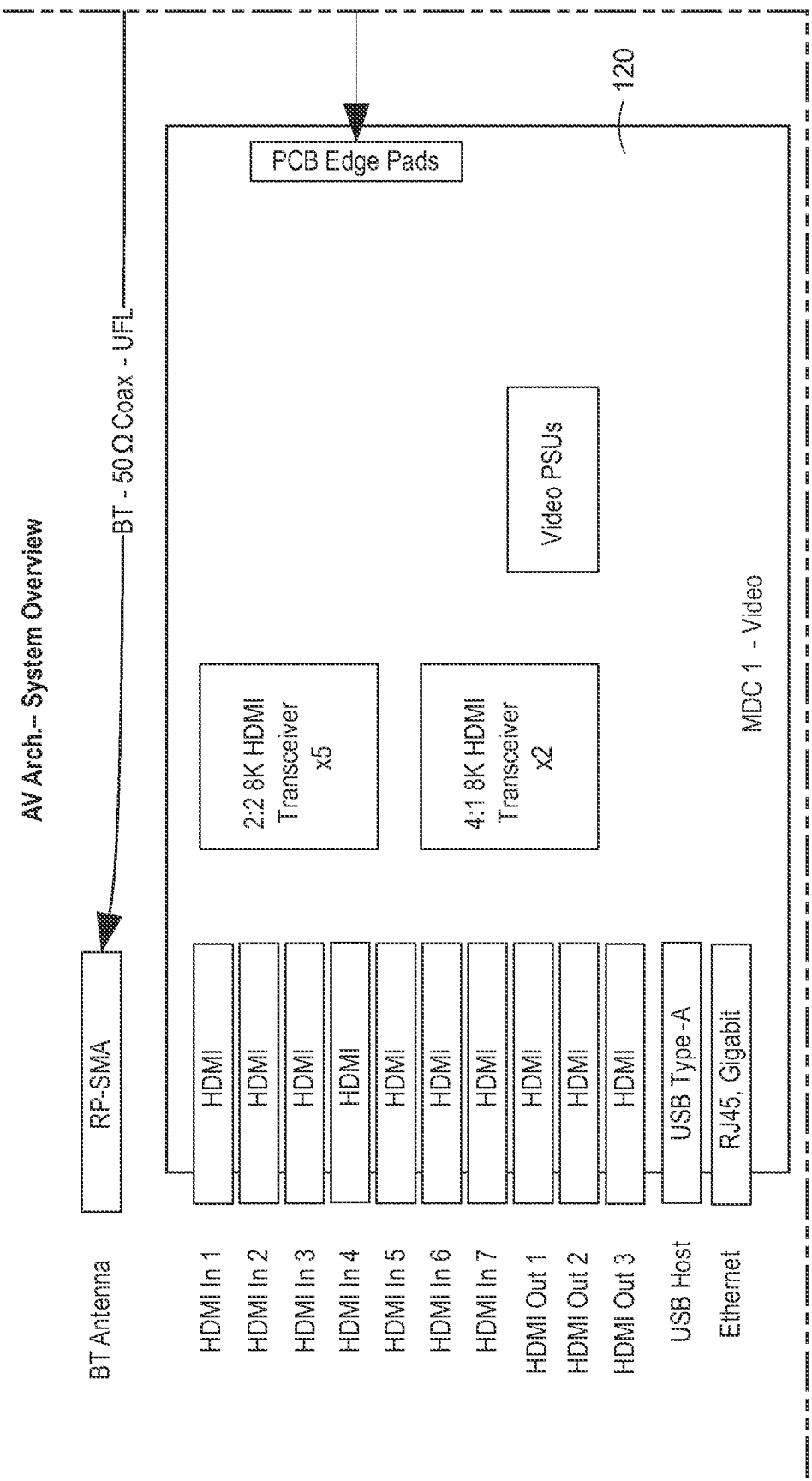

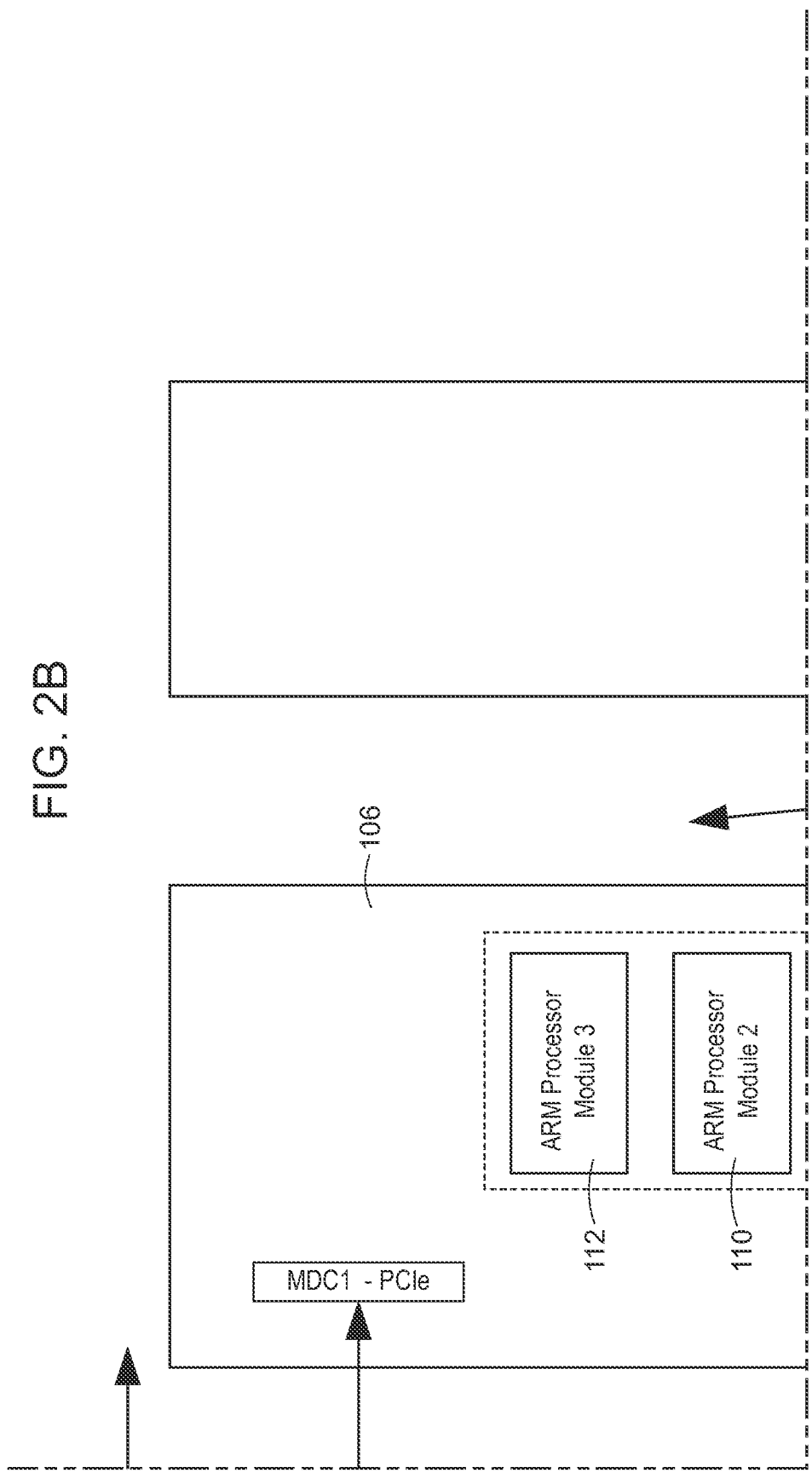

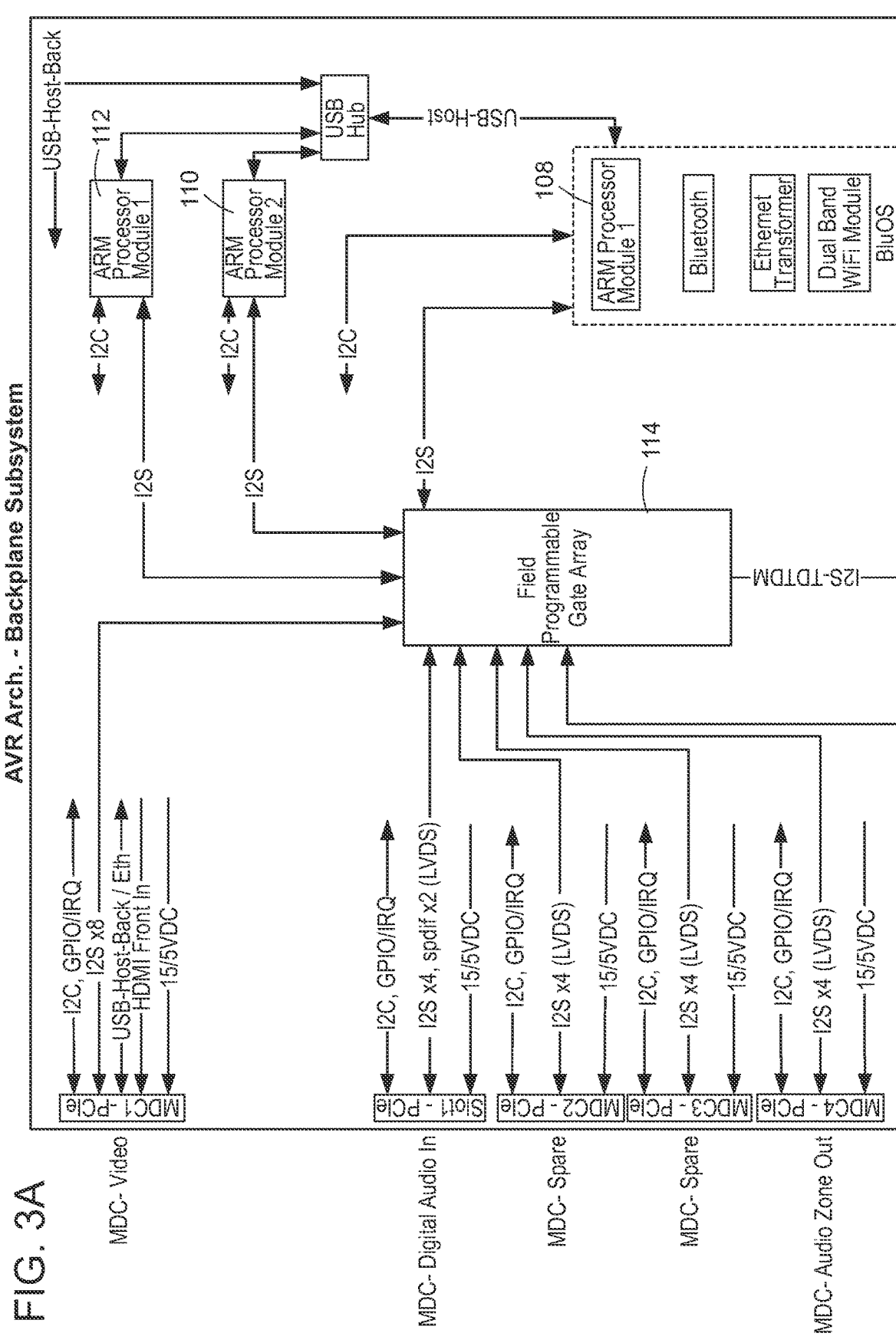

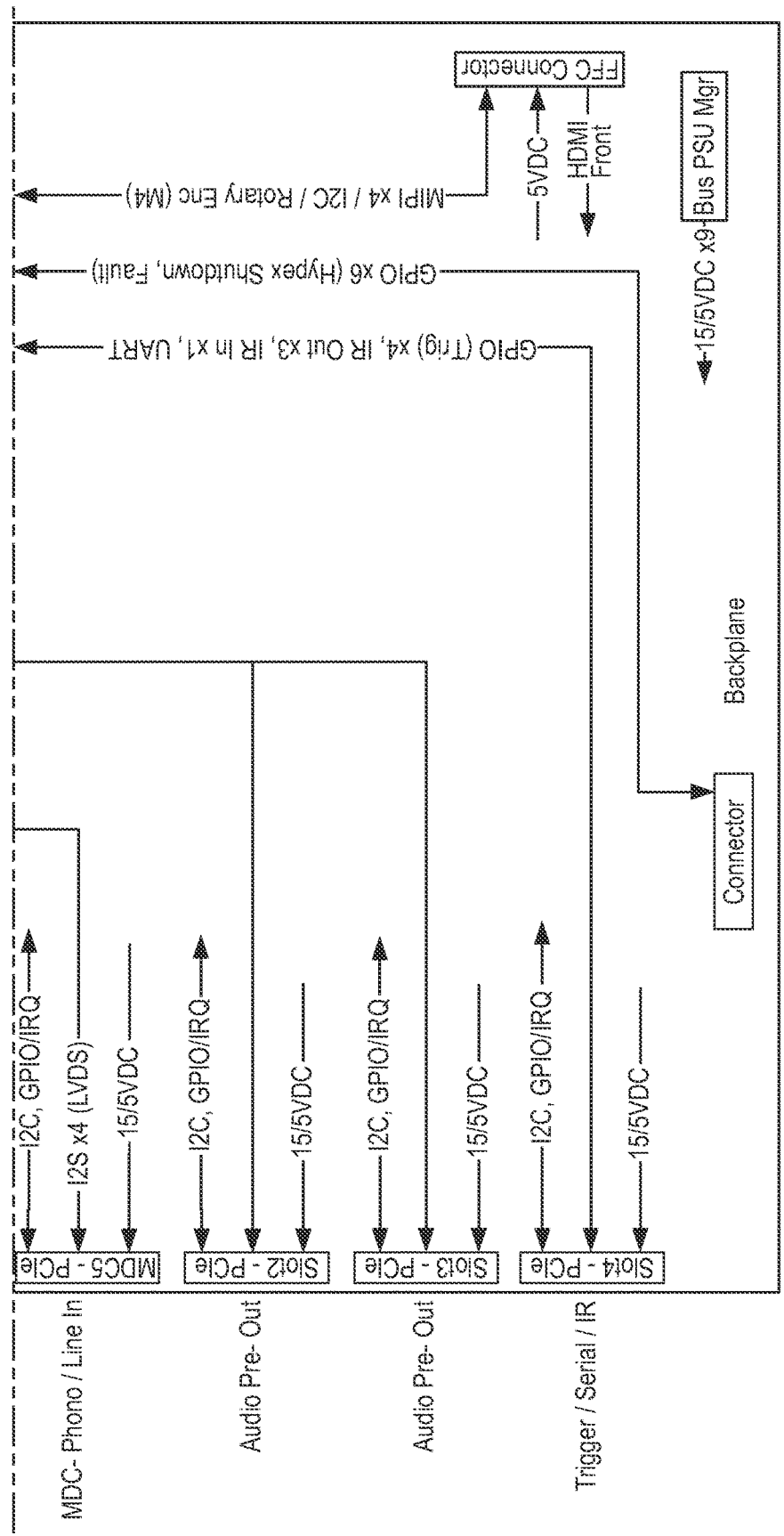
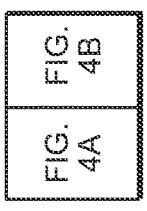
FIG. 3B
FIG. 4

AUDIO VIDEO RECEIVER (AVR) ARCHITECTURE

BACKGROUND

Consumers have had limited accessibility to high-resolution digital audio (audio files with greater than 48 kHz sample rate or higher than 16-bit audio bit depth). Lenbrook Industries Limited (owner of NAD Electronics and Bluesound Music Systems and the applicant of the present application) began development of a new type of high-resolution media audio playback system in 2004 and demonstrated such a system in 2009. By 2011, the NAD Masters Digital Suite Home Sound System enabled consumers to experience music via one or more networked playback devices. The system's BluOS™ operating system was expanded to more affordable devices with the introduction of the Bluesound brand in 2012. Through a software control application installed on a controller (e.g., IR remote, wall mounted controller, smartphone, tablet, computer, voice input device), consumers can play what they desire in any room having a networked playback device. They can access high-resolution music files by each room with a playback device and group rooms together for synchronous playback of the same music. The BluOS™ modular software design also allows the unification of audio video receiver (AVR) devices, reducing the cost of software development compared to highly proprietary microcontroller/digital signal processor (MCU/DSP) software currently used throughout the AVR industry.

AVRs became extremely popular in the consumer entertainment electronics category in the 1990s. AVRs were a critical evolutionary step from traditional stereo audio electronics, as they acted as central hub for connecting both audio and video source devices and one or more displays. AVRs include multiple audio and video input types to support independent connections to audio and/or video source devices (e.g., CD players, streaming audio clients, Blu-ray players, and game consoles). AVRs also offer multiple outputs for connection to audio-video rendering devices such as loudspeakers, television displays, and video projectors.

Users may select any one of the inputs via a remote control device so that audio-video contents flow from the currently selected source input to the output rendering device. Android and iOS apps have more recently become the preferred remote control devices over conventional infrared remote controls.

Despite the rich and sophisticated feature set of today's AVRs, the electronics hardware architecture of AVRs remains a disparate and piecemeal collection of MCU, video processor, and DSP chipsets, connected together and uniquely programmed with proprietary software to implement all of their respective features. Each chip in the AVR must be managed to apply software updates to fix software issues or add new features. Although modern software operating systems have been successfully employed in many other consumer electronic device categories (e.g., set-top boxes and game consoles), the AVR technical architecture has not progressed towards such a uniform standard. As such, current AVRs offer cumbersome on-screen user interfaces that are difficult to maintain technically and require a technical team with deep knowledge of the relatively obscure chipsets and the software language environments they support (e.g., DSPs and MCUs).

BRIEF SUMMARY OF THE DISCLOSURE

An AVR device in accordance with one or more embodiments connects audio and video source devices to audio and video rendering devices. A front panel user interface including a display is integrated in the housing of the AVR device. Input-output (IO) modules are coupled to a backplane board in the housing to be connected to the audio and video source devices and the audio and video rendering devices. The IO modules include at least one network interface. System-on-Modules (SoMs) are mounted on the backplane board. The SoMs are configured to decode and process audio and video data received from the audio and video source devices for rendering by the audio and video rendering devices and execute an operating system generating a GUI displayed on the display of the front panel user interface. A video subsystem module on the backplane board is configured to route the audio and video data between the plurality of SoMs and the IO modules.

A method in accordance with one or more embodiments includes receiving audio and video data from a plurality of audio and video source devices at a plurality of input-output (IO) modules in an Audio Video Receiver (AVR) device. The method further includes decoding and processing the audio and video data for rendering by audio and video rendering devices and executing an operating system for generating a GUI to be displayed on the display of the AVR device using a plurality of System-on-Modules (SoMs) in the AVR device. The audio and video data are routed between the plurality of SoMs and the IO modules.

BRIEF DESCRIPTION OF THE DRAWINGS

FIG. 1 is a block diagram illustrating an exemplary AVR device in accordance with one or more embodiments connected to audio/video source devices and audio/video rendering devices.

FIGS. 2A to 2H are partial views schematically illustrating an exemplary AVR device in accordance with one or more embodiments. FIG. 2 is a scale view indicating the respective positions of the partial views.

FIGS. 3A and 3B are partial views schematically illustrating an exemplary backplane board of an AVR device in accordance with one or more embodiments.

FIG. 4 is a scale view indicating the respective positions of the partial views.

Like or identical reference numbers are used to identify common or similar elements.

DETAILED DESCRIPTION

FIG. 1 is a simplified block diagram illustrating an exemplary AVR device 100 in accordance with one or more embodiments connecting a plurality of audio and video source devices 102 (e.g., streaming audio or video clients, CD players, Blu-Ray players, set top boxes, and game consoles) to a plurality of audio and video rendering devices 104 (e.g., speakers, television displays, and video projectors). Users can select an AVR input and output (using a touchscreen display on the AVR or a remote control device) so that audio-video content flows from a selected source input to a selected output rendering device.

The AVR 100 includes a plurality of System-on-Modules (SoMs), which are small form-factor computing hardware modules. The SoMs include, among other things, a central microprocessor, random access memory (RAM) for run-time data storage, and flash memory for non-volatile storage of software program instructions needed for power-on boot and executing applications.

The SoMs in the AVR 100 have advanced RISC machine (ARM) processors executing the Linux operating system. Unlike specialized MCUs, DSP audio processors, and their specialized run-time software, ARM chips and Linux operating systems are commonly used and understood platform components across the embedded computing industry. This industry-standard design approach makes the task of programming the AVR 100 significantly more accessible to a larger community of Linux software developers and ARM hardware design engineers. By contrast, DSP software development for AVR applications is a skill set possessed by only a handful of costly, specialized consultancies throughout the world. System hardware and software development for the AVR 100 design is thus significantly less expensive than conventional DSP/MCU based AVR architectures.

An ARM/Linux architecture also allows the use of proven and standard software libraries included with Linux such as user-friendly graphics for LCD and TV displays and data networking. Linux also supports the BluOS audio operating system available from Lenbrook, which can bring a large collection of (e.g., over 20) popular Internet music services to the AVR platform. This seamless integration of music service support and rich graphical user-interfaces is unique for AVRs.

Figure 2C:
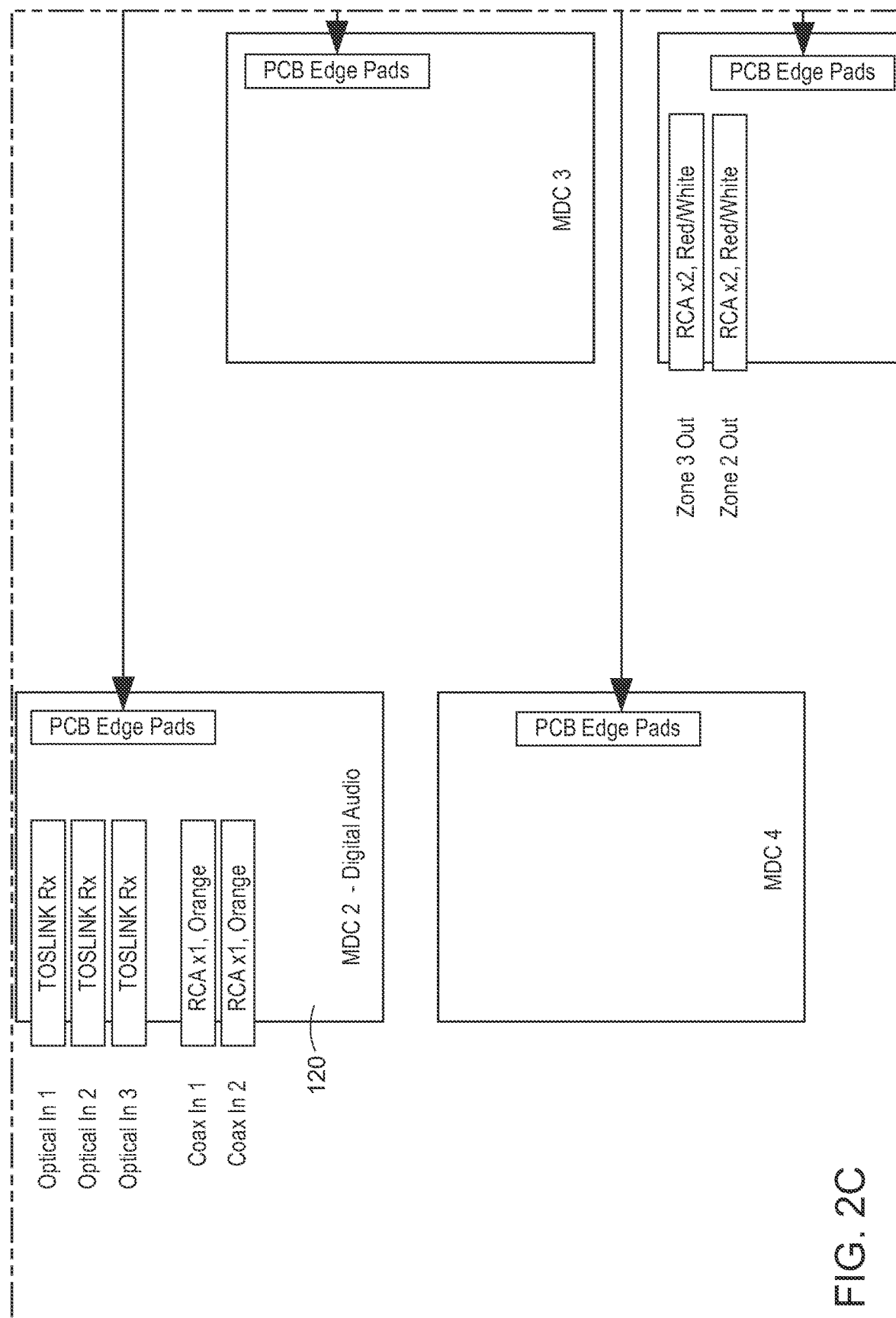
Figure 2D:
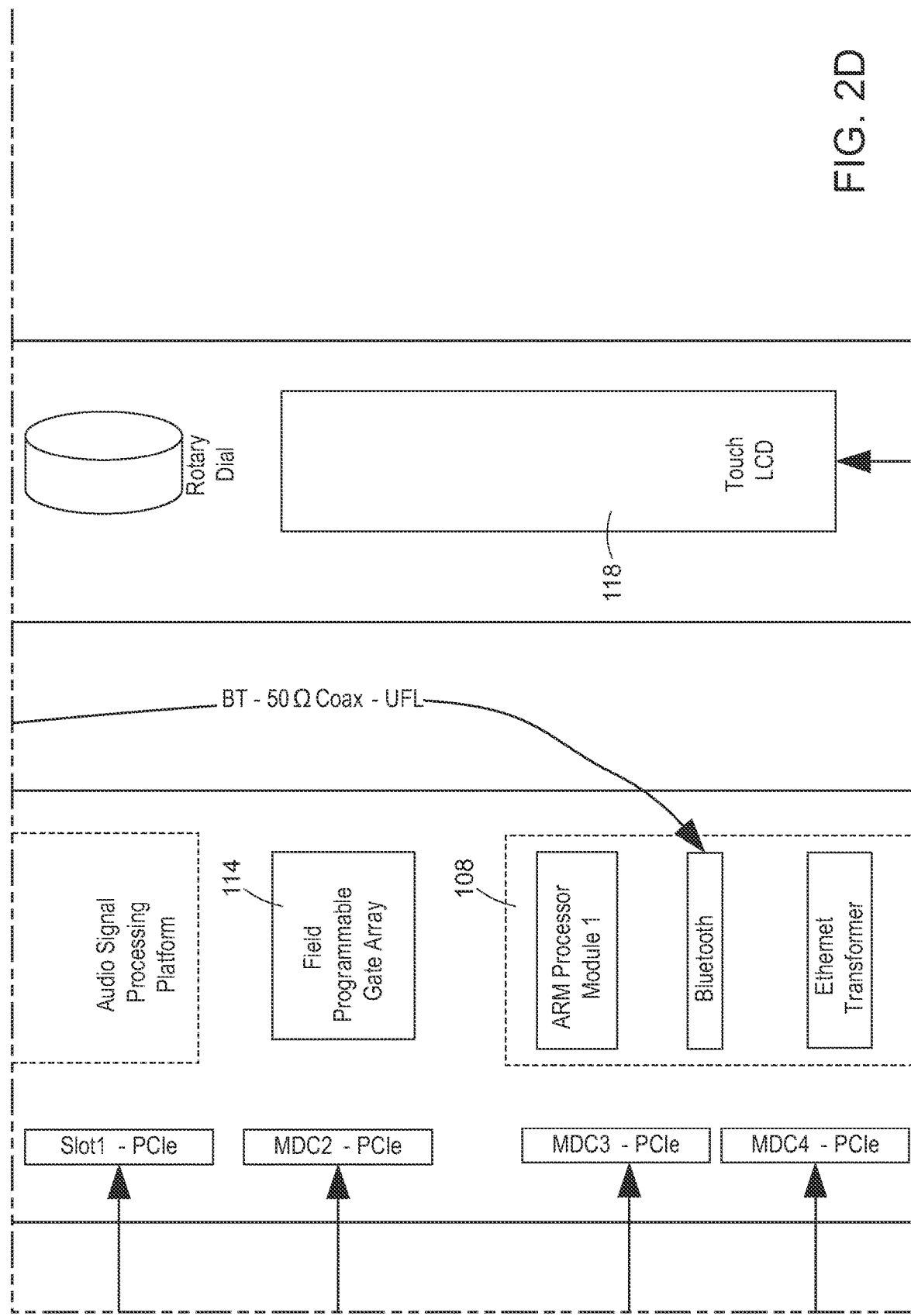
Figure 2E:
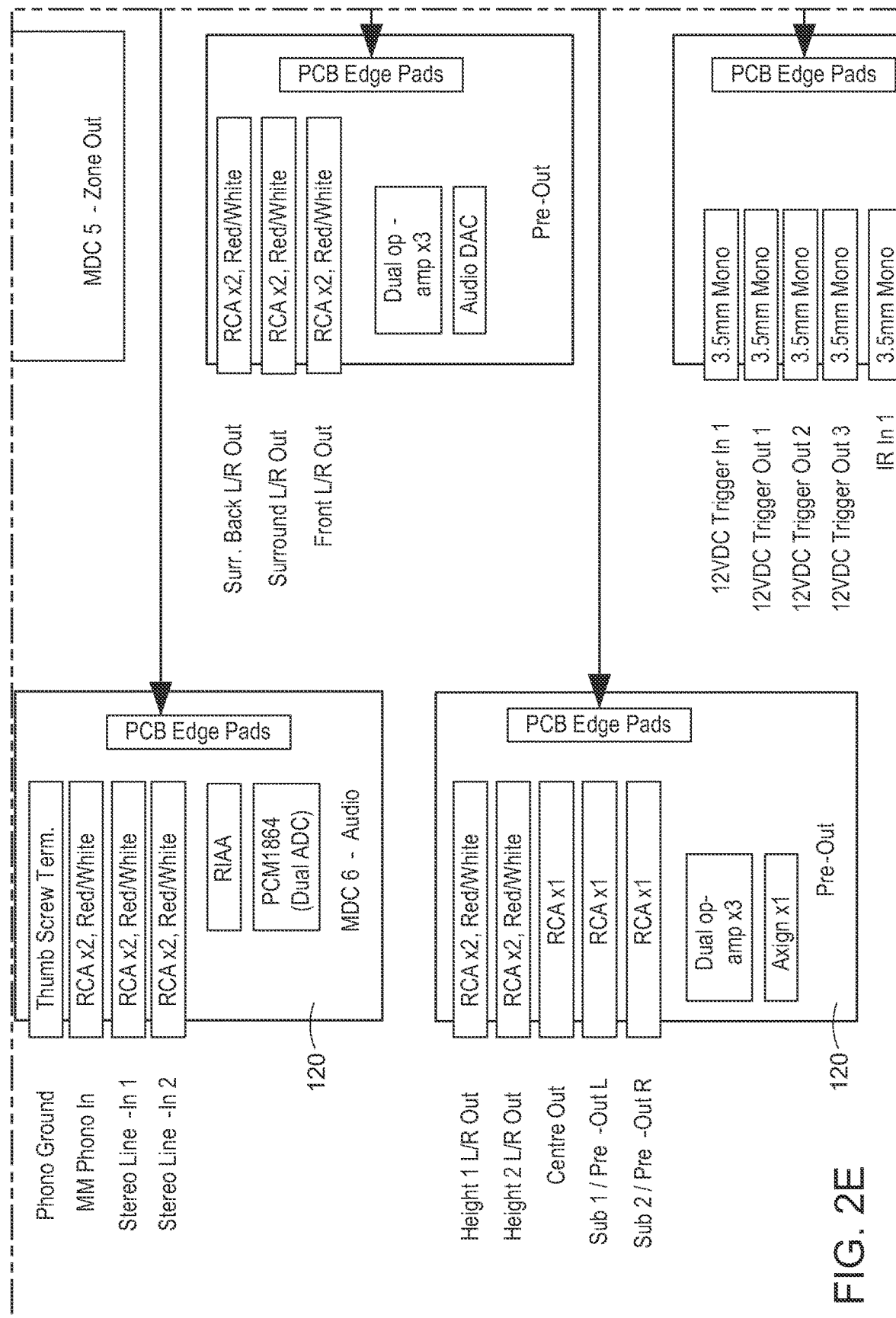
Figure 2F:
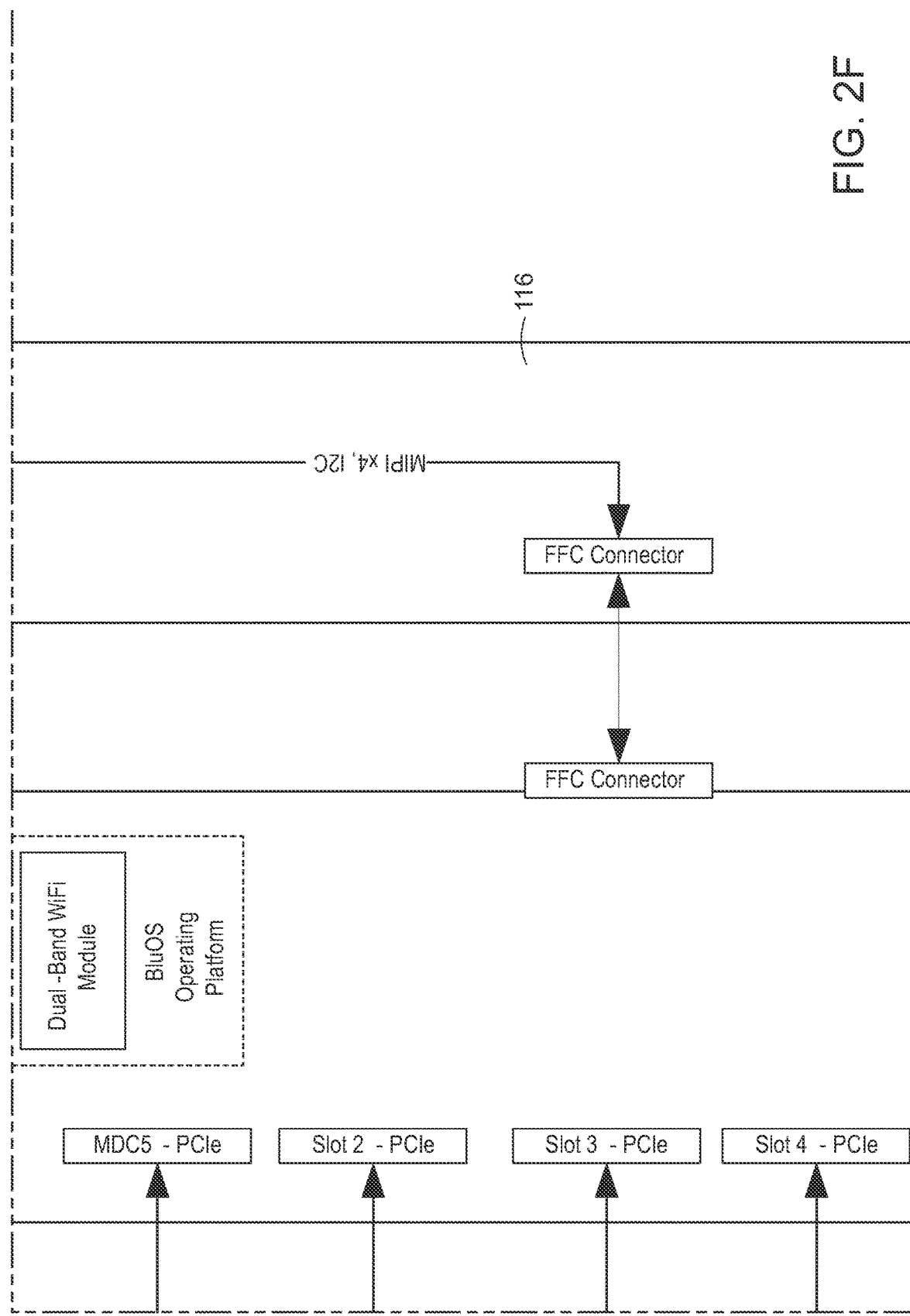
Figure 2G:
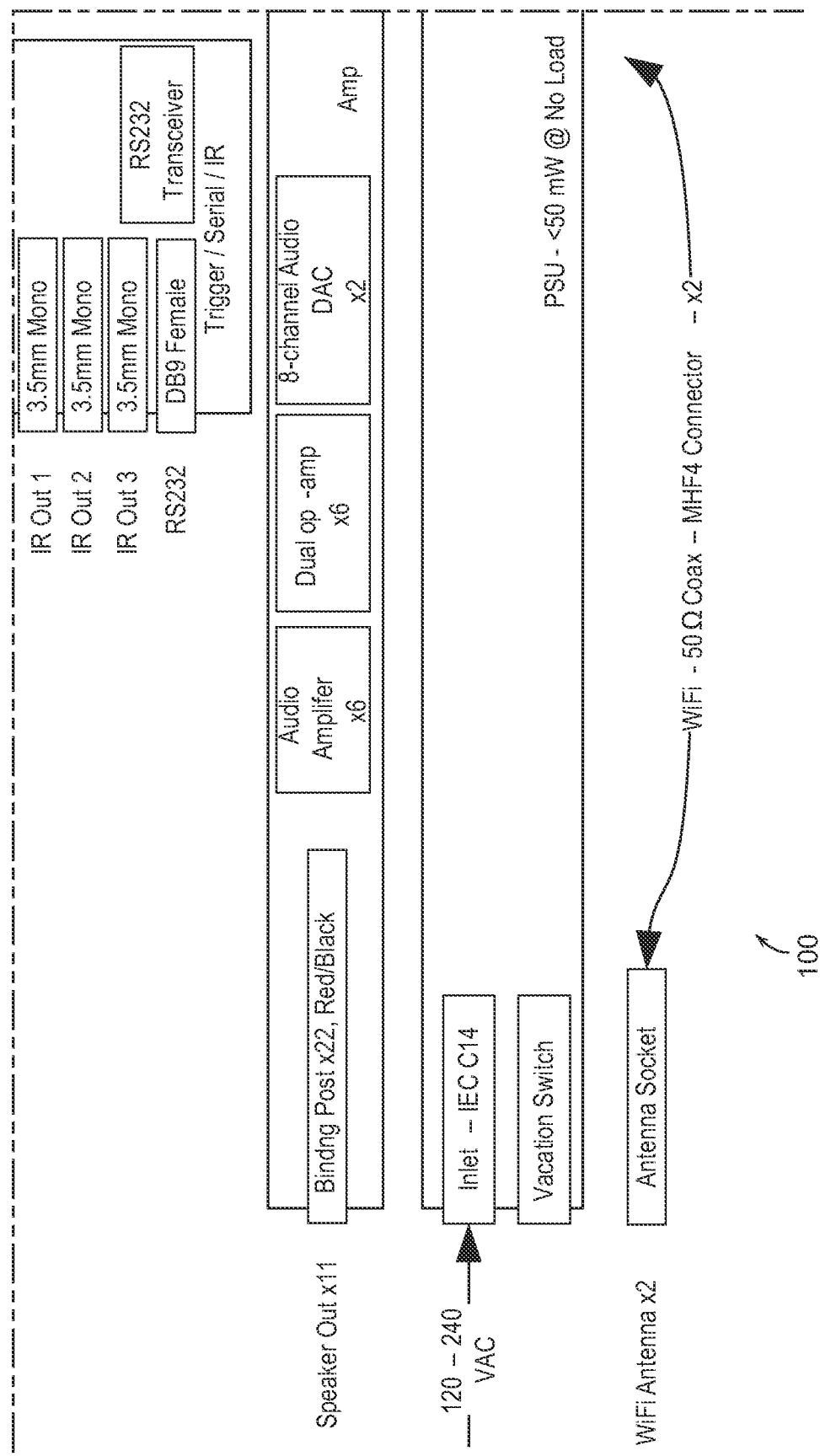
Figure 2H:
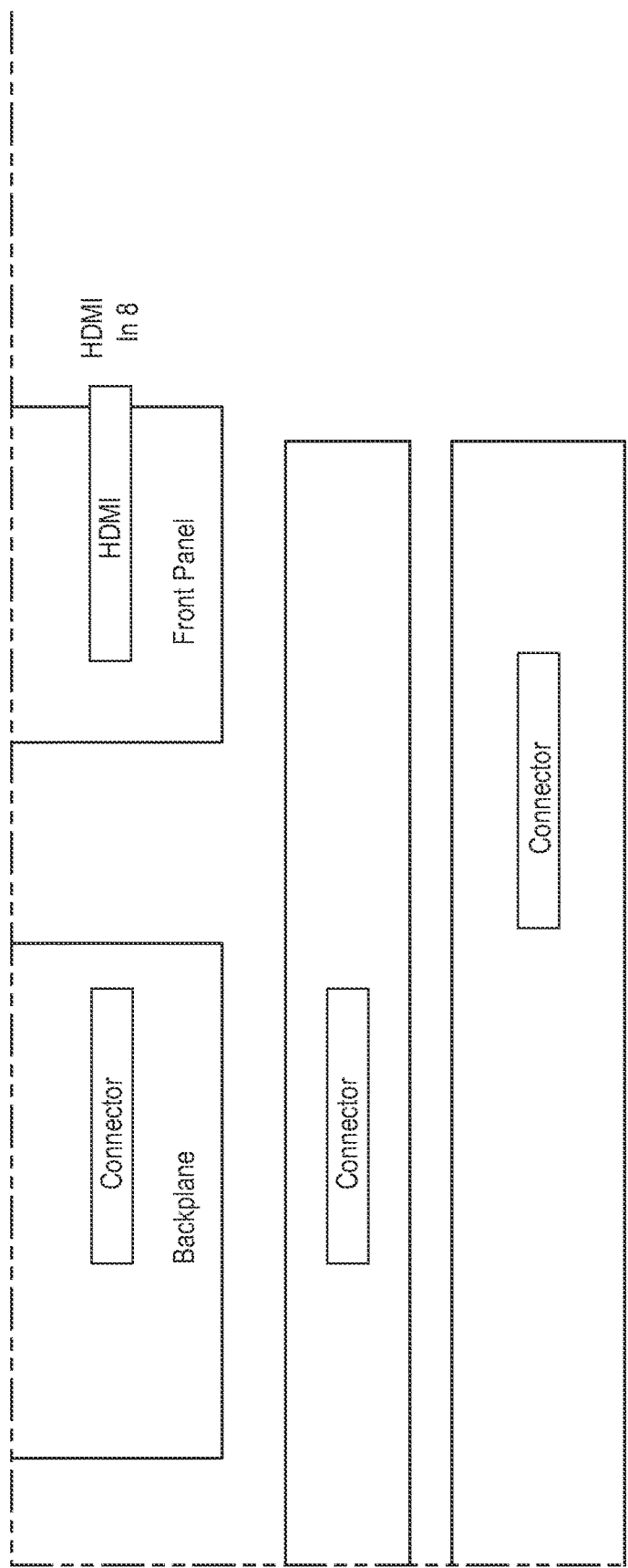
Figure 3:
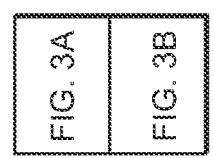
FIG. 3 is a scale view indicating the respective positions of the partial views.
Figure 4A:
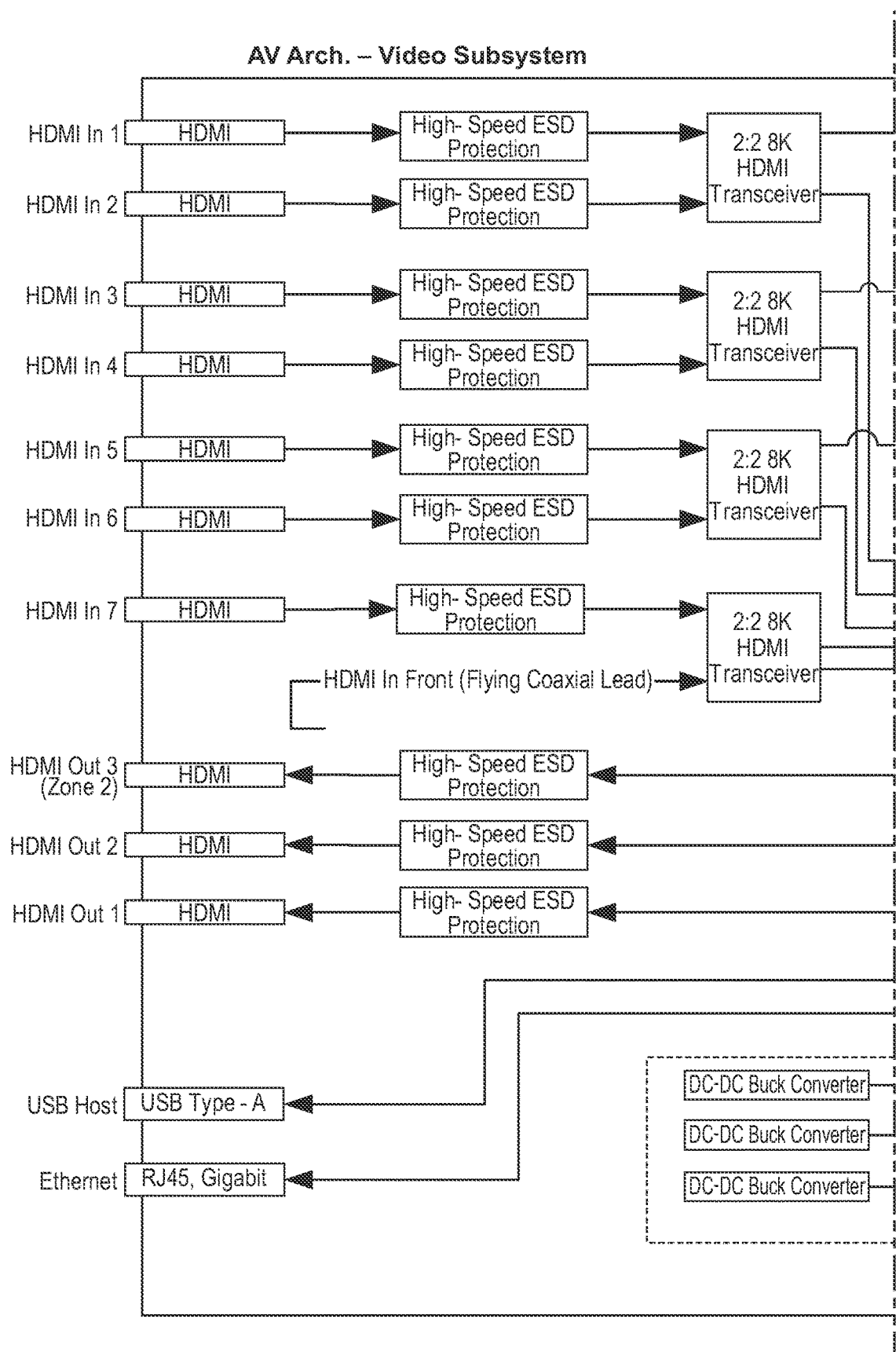
FIGS. 4A and 4B are partial views schematically illustrating an exemplary video subsystem module of an AVR device in accordance with one or more embodiments.
Figure 4B:
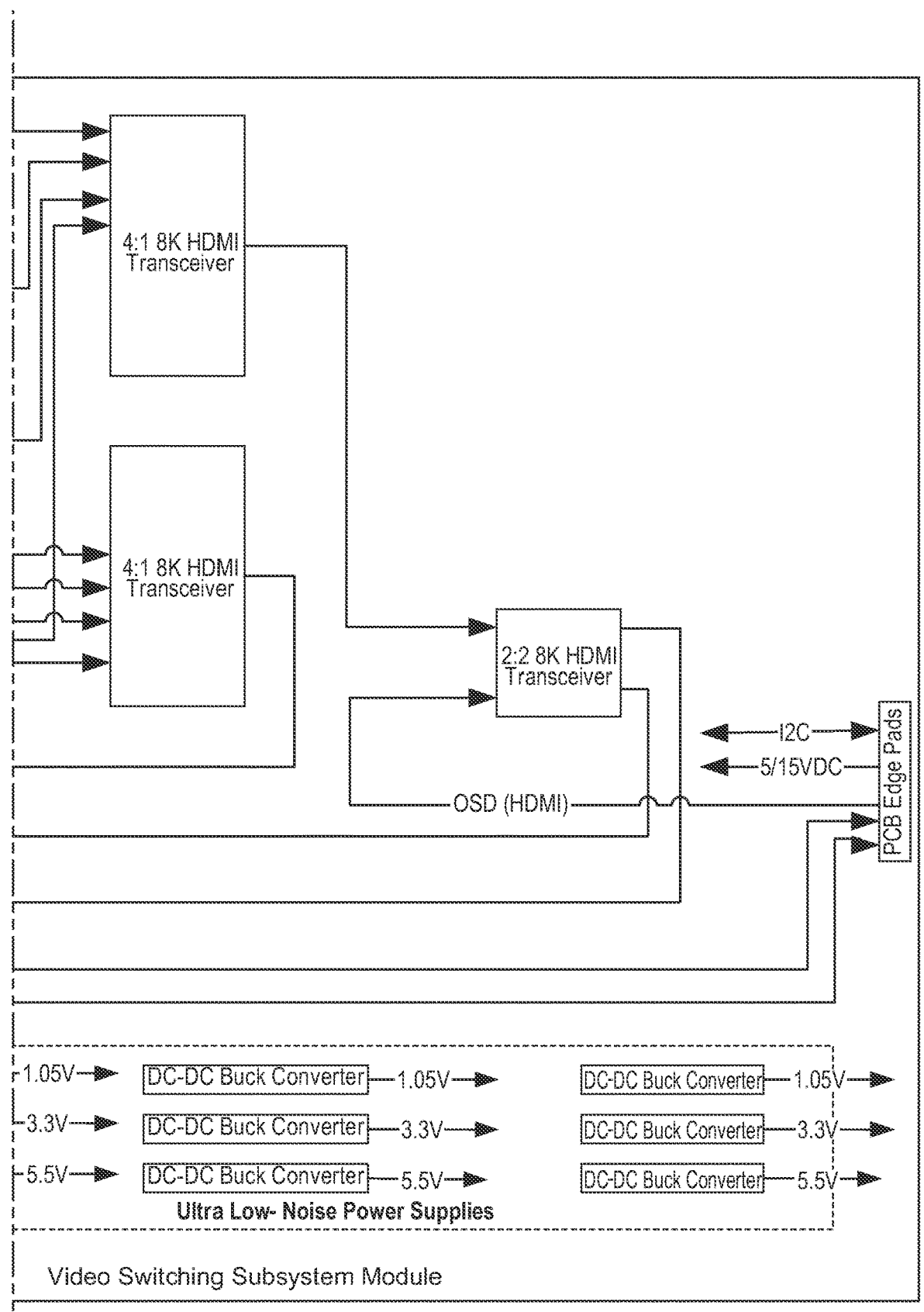

FIGS. 2A-2H are partial view depicting a system block diagram schematically illustrating components of an exemplary AVR device 100 in accordance with one or more embodiments. The AVR 100 comprises a collection of unique hardware modules, including a backplane board 106 (shown in further detail in FIGS. 3A-3B), three ARM SoMs 108, 110, 112, and a video subsystem module 114 (shown in further detail in FIGS. 4A-4B) mounted on the backplane board 106. The AVR 100 also includes a front panel user interface 116 having a display 118 (e.g., a full-color LCD touch screen) that is fully supported by the Linux operating system executing on SoM 108. A set of input-output (IO) modules 120 are connected to the backplane 106.

Different AVR software functionalities are divided among the three ARM SoMs 108, 110, 112. SoM 108 features a power quad-core ARM processor running BluOS. SoMs 110, 112 also include the same or similar quad-core ARM processors executing run-time software to decode and process advanced audio formats such as Dolby Atmos and apply popular acoustic correction software such as Dirac. The BluOS software running on SoM 108 hosts and controls all other subsystem modules and the touch screen user interface 118. BluOS can generate a multilingual graphical user interface (GUI) that can be displayed simultaneously on the LCD 118 and inserted into a high-definition video stream carried by the video module 114 and presented on a TV display connected to the HDMI output of the video module 114. BluOS can also support a local area network (LAN) connection to a home network through, e.g., wired Ethernet or WiFi. This interface allows remote control and configuration of the AVR 100 from other devices including iOS and Android apps and popular residential control systems such as, e.g., Crestron and RTI.

Although different application software may be executed on each of the three SoMs, they share a common, standardized electronic circuit schematic design. The connectors of each SoM are standardized and share a common pinout. This SoM hardware standardization allows the SoMs powerful flexibility as one or more of them may be installed in a multiple variation of different AVR models. This reduces manufacturing unit cost as a large number of SoMs may be manufactured and easily deployed in new AVR models operating different software feature sets as required by the price-point of a specific AVR SKU. Furthermore, this hardware standardization strategy allows deploying the SoMs in product lines other than AVRs, such as whole-home audio streaming systems.

Although SoM hardware designs are standardized with common integration pinouts, SoMs may be fitted with different microprocessor variants that suit the needs of a particular product. For example, a standard SoM circuit board may be fitted with a processor variant part number that is keyed to run licensed audio decoding software released, e.g., by Dolby and DTS. The same generalized standard SoM circuit board may alternatively be fitted with a lower-cost, non-keyed microprocessor variant if the SoM is to be installed in a product that only executes online music service software for popular music services such as Apple Music or Spotify. In another example, SoMs of the same hardware design standard may be fitted with the costly processor variants that support high definition video for products that need to generate advanced on-screen displays or decode and render high-quality music videos offered by specialized music video streaming services.

As the SoMs represent some of the most expensive high-speed circuit board material and electronic components in a product's chassis, standardizing its electronic design to enable its use across a wide variety of products dramatically improves economies of scale. The standardized SoM hardware thereby has significant cost advantages over unique, high-speed circuit boards fabricated in much smaller quantities to meet the specific needs of each individual product.

In one or more embodiments, the SoMs 108, 110, 112 each include two connectors to support a broad set of peripheral connections to other devices included in the AVR chassis. Examples of such peripherals include WiFi, Ethernet, USB and low-speed I2C standard interfaces for controlling and monitoring the AVR's audio and video subsystems.

In one or more embodiments, the video subsystem module 114 in the AVR 100 is implemented in a field programmable gate array (FPGA) mounted on the backplane board 106. The video subsystem module 114 routes digital audio signal between SoMs 110, 112 and the audio IO peripheral chips 120, which can include digital-to-analog converters (DACs).

The video subsystem module 114 receives concurrent digital video streams at its HDMI 2.1 inputs. High-resolution cinematic audio streams can be extracted from the incoming audio video streams, and passed to the AVR's SoMs 110, 112 for decoding and acoustic processing before rendering by the AVR's integrated digital audio amplifiers. The remaining video component of the incoming audio video streams may be routed to any one of the system's outputs, as selected by the user through the multilingual graphics interface generated by SoM 108 and presented on the display device (e.g., a TV or projector) connected to one of the AVR's HDMI outputs. By way of example, the received video streams can have 8K video resolution.

U.S. patent application Ser. No. 17/360530 entitled "Audio Video Receiver With Simultaneous Multizone 8K Video Routing" assigned to the assignee of the present application is incorporated by reference herein. That application discloses one example of a suitable video subsystem module for simultaneously routing audio and video signals.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

The invention claimed is:

1. An Audio Video Receiver (AVR) device for connecting audio and video source devices to audio and video rendering devices, the AVR device comprising:
   a housing;
   a front panel user interface integrated in the housing including a display;
   a backplane board in the housing;
   a plurality of input-output (IO) modules coupled to the backplane board to be connected to the audio and video source devices and the audio and video rendering devices, the IO modules also including at least one network interface;
   a plurality of System-on-Modules (SoMs) mounted on the backplane board, the plurality of SoMs being configured to decode and process audio and video data received from the audio and video source devices for rendering by the audio and video rendering devices and execute an operating system generating a graphical user interface (GUI) displayed on the display of the front panel user interface; and
   a video subsystem module mounted on the backplane board configured to route the audio and video data between the plurality of SoMs and the IO modules.

2. The AVR device of claim 1, wherein the plurality of SoMs have a common standardized electronic circuit schematic design and common integration pinouts.

3. The AVR device of claim 1, wherein each of the plurality of SoMs includes an advanced RISC machine (ARM) processor.

4. The AVR device of claim 1, wherein each of the plurality of SoMs includes at least a microprocessor and memory.

5. The AVR device of claim 1, wherein each of the plurality of SoMs includes at least a microprocessor, a random access memory for run-time data storage, and flash memory for non-volatile storage of software program instructions for power-on boot and executing applications.

6. The AVR device of claim 1, wherein one of the plurality of SoMs is configured to execute the operating system, and another one of the plurality of SoMs is configured to decode and process the audio and video data received from the audio and video source devices.

7. The AVR device of claim 1, wherein processing the audio and video data received from the audio and video source devices includes processing the audio data in an advanced audio format.

8. The AVR device of claim 1, wherein processing the audio and video data received from the audio and video source devices includes applying acoustic correction to the audio data.

9. The AVR device of claim 1, wherein one of the plurality of SoMs is configured to generate the GUI to be displayed on the display and to simultaneously insert GUI information in a video stream to be displayed on a television display.

10. The AVR device of claim 1, wherein the operating system supports a local area network (LAN) connection through the at least one network interface enabling remote control and configuration of the AVR device using other devices.

11. The AVR device of claim 10, wherein the other devices comprise a home automation system, a remote control device, a smartphone, a tablet, a personal computer, or a voice input device.

12. The AVR device of claim 1, wherein the operating system supports networking, communications, timing, storage, and IO functions of the AVR device.

13. The AVR device of claim 1, wherein each of the plurality of SoMs includes at least two connectors to support different peripheral connections to other devices included in the housing.

14. The AVR device of claim 13, wherein the other devices comprise a WiFi interface, an Ethernet interface, a USB interface, or an I2C standard interface for controlling and monitoring the video subsystem module.

15. The AVR device of claim 1, wherein the display of the front panel user interface comprises a color LCD touch screen.

16. The AVR device of claim 1, wherein the at least one network interface supports a local area network (LAN) connection to a home network through an Ethernet connection or a WiFi connection.

* * * * *